(12) United States Patent
Sakurai et al.

(10) Patent No.: US 7,629,048 B2
(45) Date of Patent: *Dec. 8, 2009

(54) POLYVINYL CHLORIDE FIBER, PROCESS FOR PRODUCING THE SAME, AND USE THEREOF

(75) Inventors: Akira Sakurai, Kamakura (JP); Masamichi Kanaoka, Kamakura (JP); Akira Moroi, Kamakura (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 622 days.

This patent is subject to a terminal disclaimer.

(21) Appl. No.: 10/544,466

(22) PCT Filed: Apr. 1, 2004

(86) PCT No.: PCT/JP2004/004784

§ 371 (c)(1), (2), (4) Date: Aug. 4, 2005

(87) PCT Pub. No.: WO2004/090208

PCT Pub. Date: Oct. 21, 2004

(65) Prior Publication Data

US 2006/0141248 A1  Jun. 29, 2006

(30) Foreign Application Priority Data

Apr. 4, 2003 (JP) ............... 2003-101663
May 13, 2003 (JP) ............... 2003-134604

(51) Int. Cl.
  *C08L 27/06* (2006.01)
  *D02G 3/00* (2006.01)
  *C07C 17/42* (2006.01)

(52) U.S. Cl. ............... 428/364; 428/394; 525/239; 570/102

(58) Field of Classification Search ............... None
See application file for complete search history.

(56) References Cited

U.S. PATENT DOCUMENTS 3,372,219 A * 3/1968 Gord ............... 525/239
5,354,812 A * 10/1994 Soby et al. ............... 525/239

FOREIGN PATENT DOCUMENTS

| JP | 47-34543 | 11/1972 |
| JP | 58-81613 | 5/1983 |
| JP | 5-132602 | 5/1993 |
| JP | 6-184813 | 7/1994 |
| JP | 10-102317 | 4/1998 |
| JP | 10-251916 | 9/1998 |
| JP | 11-61555 | 3/1999 |
| JP | 2003-193329 | 7/2003 |
| JP | 3705770 | 8/2005 |

OTHER PUBLICATIONS

M.H. Lehr, "Miscibility in Poly(vinyl Chloride)/Chlorinated Poly(Vinyl Chloride)", Polymer Engineering & Science, vol. 24, No. 17, pp. 1056-1068.*
Japanese Patent Office issued a Japanese Office Action dated Jul. 7, 2009, Application No. 2005-505248.

* cited by examiner

*Primary Examiner*—David R Sample
*Assistant Examiner*—Nicole T Gugliotta
(74) *Attorney, Agent, or Firm*—Young & Thompson

(57) ABSTRACT

Polyvinyl chloride fibers obtainable by molding a resin composition containing 100 parts by weight of a vinyl chloride resin, from 3 to 20 parts by weight of a compatible chlorinated vinyl chloride resin, from 10 to 30 parts by weight of a heat resistant chlorinated vinyl chloride resin, and from 0.1 to 10 parts by weight of a heat stabilizer into a fibrous form, the compatible chlorinated vinyl chloride resin having a chlorine content of from 57 to 64% by weight and an average degree of polymerization of from 450 to 800; and the heat resistant chlorinated vinyl chloride resin having a chlorine content of from 65 to 71% by weight and an average degree of polymerization of from 450 to 1,100, to a process of producing the same and to applications thereof.

6 Claims, No Drawings

POLYVINYL CHLORIDE FIBER, PROCESS FOR PRODUCING THE SAME, AND USE THEREOF

FIELD OF THE INVENTION

The present invention relates to polyvinyl chloride fibers, especially polyvinyl chloride fibers which are small in heat shrinkage even in an atmosphere of 100° C. or higher while keeping conventional spinning performance, to a process for producing the same and to applications thereof.

BACKGROUND ART

Vinyl chloride resins are utilized for various applications as a typical general-purpose plastic because they are excellent in transparency, fire retardancy and chemical resistance and inexpensive. Of these, polyvinyl chloride fibers are closed to natural hairs with respect to strength, ductility, and so on and therefore, are frequently used as fibers for artificial hairs for the hair. Polyvinyl chloride fibers themselves are shrunk beyond the need due to heat in secondary processing. As means for solving this, a process of producing polyvinyl chloride fibers made of a composition containing a vinyl chloride resin and a heat resistant chlorinated vinyl chloride resin is disclosed (for example, Patent Document 1).

The polyvinyl chloride fibers of this means are one in which a component of one side is dispersed as an island component in the other component within the fibers, and the fibers are crimped by heating.

However, in the polyvinyl chloride fibers of the foregoing means, if heat of 100° C. or higher is applied for the purpose of secondary processing of the fibers, the fibers are heat shrunk beyond the need so that the processing characteristics become inferior.

For the sake of adjusting the crimping properties of fibers, a method in which the blending amount of a chlorinated vinyl chloride resin in the composition is increased, thereby lowering heat shrinkage of the resin composition itself may be considered. Originally, a vinyl chloride resin and a chlorinated vinyl chloride resin are poor in compatibility. Thus, if the blending amount of the chlorinated vinyl chloride resin is merely increased, phase separation takes place in melt-spinning fibers so that the spinning performance are deteriorated, and therefore, such is not preferable.

For the purpose of enhancing the compatibility between a vinyl chloride resin and a chlorinated vinyl chloride resin, a method of adding an ethylene-vinyl acetate/vinyl chloride graft polymer resin resulting from graft polymerization of vinyl chloride on an ethylene-vinyl acetate copolymer is disclosed (for example, Patent Document 2).

However, since the heat shrinkage of the ethylene-vinyl acetate/vinyl chloride graft polymer resin itself is equivalent to that of the vinyl chloride resin, even if the compatibility between the vinyl chloride resin and the chlorinated vinyl chloride resin is enhanced, the heat shrinkage of the resin composition itself is increased, and therefore, such is not preferable. While it is required to select a resin having itself heat resistance to some extent while enhancing the compatibility between the vinyl chloride resin and the chlorinated vinyl chloride resin, it has not reached selection of a satisfactory resin yet.

[Patent Document 1]
JP-B-60-18323

[Patent Document 2]
JP-A-10-102317

DISCLOSURE OF THE INVENTION

An object of the invention is to provide polyvinyl chloride fibers which enhance compatibility between a vinyl chloride resin and a chlorinated vinyl chloride resin and are small in heat shrinkage even in an atmosphere of 100° C. or higher while keeping spinning performance at the time of melt-spinning, a process of producing the same, and applications thereof.

In view of the foregoing, the present inventor made extensive and intensive investigations regarding a formulation of a resin composition. As a result, it has been found that by formulating a specific resin composition, the foregoing problems can be solved, leading to accomplishment of the invention. The invention has the following constructions.

(1) Polyvinyl chloride fibers obtainable by molding a resin composition containing 100 parts by weight of a vinyl chloride resin, from 3 to 20 parts by weight of a compatible chlorinated vinyl chloride resin, from 10 to 30 parts by weight of a heat resistant chlorinated vinyl chloride resin, and from 0.1 to 10 parts by weight of a heat stabilizer into a fibrous form, wherein the compatible chlorinated vinyl chloride resin has a chlorine content of from 57 to 64% by weight and an average degree of polymerization of from 450 to 800, and the heat resistant chlorinated vinyl chloride resin has a chlorine content of from 65 to 71% by weight and an average degree of polymerization of from 450 to 1,100.

(2) The polyvinyl chloride fibers according to the above (1), wherein the compatible chlorinated vinyl chloride resin has a fluidity of 0.05 cc/sec or more and not more than 0.2 cc/sec, and the heat resistant chlorinated vinyl chloride resin has a fluidity of 0.005 cc/sec or more and less than 0.05 cc/sec.

(3) The polyvinyl chloride fibers according to the above (1) or (2), wherein the heat stabilizer is one kind or a mixture of two or more kinds selected from hydrotalcite compounds, calcium-zinc based compounds, epoxy compounds, organic phosphite compounds, and β-diketones.

(4) A process for producing polyvinyl chloride fibers, comprising forming a resin composition containing 100 parts by weight of a vinyl chloride resin, from 3 to 20 parts by weight of a compatible chlorinated vinyl chloride resin, from 10 to 30 parts by weight of a heat resistant chlorinated vinyl chloride resin, and from 0.1 to 10 parts by weight of a heat stabilizer into a fibrous form, wherein the compatible chlorinated vinyl chloride resin has a chlorine content of from 57 to 64% by weight and an average degree of polymerization of from 450 to 800, the heat resistant chlorinated vinyl chloride resin has a chlorine content of from 65 to 71% by weight and an average degree of polymerization of from 450 to 1,100, and wherein the measure for forming into a fibrous form being melt-spinning.

(5) The process of producing polyvinyl chloride fibers according to the above (4), wherein the compatible chlorinated vinyl chloride resin has a fluidity of 0.05 cc/sec or more and not more than 0.2 cc/sec, and the heat resistant chlorinated vinyl chloride resin has a fluidity of 0.005 cc/sec or more and less than 0.05 cc/sec.

(6) The process of producing polyvinyl chloride fibers according to the above (4) or (5), wherein the heat stabilizer is one kind or a mixture of two or more kinds selected from hydrotalcite compounds, calcium-zinc based compounds, epoxy compounds, organic phosphite compounds, and β-diketones.

(7) A resin composition for polyvinyl chloride fibers, which comprises 100 parts by weight of a vinyl chloride resin, from 3 to 20 parts by weight of a compatible chlorinated vinyl chloride resin, from 10 to 30 parts by weight of a heat resistant chlorinated vinyl chloride resin, and from 0.1 to 10 parts by weight of a heat stabilizer into a fibrous form, wherein the compatible chlorinated vinyl chloride resin has a chlorine content of from 57 to 64% by weight and an average degree of polymerization of from 450 to 800, and the heat resistant chlorinated vinyl chloride resin has a chlorine content of from 65 to 71% by weight and an average degree of polymerization of from 450 to 1,100.

(8) The resin composition for polyvinyl chloride fibers according to the above (7), wherein the compatible chlorinated vinyl chloride resin has a fluidity of 0.05 cc/sec or more and not more than 0.2 cc/sec, and the heat resistant chlorinated vinyl chloride resin has a fluidity of 0.005 cc/sec or more and less than 0.05 cc/sec.

(9) The resin composition for polyvinyl chloride fibers according to the above (7) or (8), wherein the heat stabilizer is one kind or a mixture of two or more kinds selected from hydrotalcite compounds, calcium-zinc based compounds, epoxy compounds, organic phosphite compounds, and β-diketones.

(10) Artificial hairs formed of the polyvinyl chloride fibers according to the above (1) or (3).

Since the polyvinyl chloride fibers of the invention are small in heat shrinkage even in an atmosphere of 100° C. or higher while keeping spinning performance at the time of melt-spinning, they can be suitably used as fibers for artificial hairs for the hair.

According to the process of producing polyvinyl chloride fibers of the invention, polyvinyl chloride fibers capable of solving the foregoing problems can be suitably produced.

According to the resin composition of the invention, by employing the foregoing specific construction, fibers for artificial hairs for the hair can be produced because of small heat shrinkage even in an atmosphere of 100° C. or higher while keeping spinning performance at the time of melt-spinning.

The artificial hairs of the invention are small in heat shrinkage even in an atmosphere of 100° C. or higher.

According to the invention of this application, by mixing a vinyl chloride resin with a compatible chlorinated vinyl chloride resin and a heat resistant chlorinated vinyl chloride resin each having specific chlorine content, average degree of polymerization and fluidity in a suitable blending ratio, polyvinyl chloride fibers capable of lowering heat shrinkage to proper extent without impairing spinning performance, a process for producing the same and applications thereof have been found.

According to the present invention, by selecting a heat stabilizer among specific combinations, a synergistic effect between the heat stabilizer and the compatible chlorinated vinyl chloride resin is obtained, and it can be designed to enhance spinning performance of the resin composition and to prevent heat decomposition.

BEST MODE FOR CARRYING OUT THE INVENTION

As the vinyl chloride resin to be used in the invention, known resins which are generally used as polyvinyl chloride fibers can be employed, and specific examples thereof include a vinyl chloride homopolymer, copolymers of vinyl chloride with ethylene, propylene, alkyl vinyl ethers, vinylidene chloride, vinyl acetate, acrylic esters, maleic esters, etc., and mixtures thereof. However, the degree of polymerization is preferably from 600 to 1,300. When the degree of polymerization is less than 600, the melt viscosity is lowered so that the resulting fibers may possibly be likely heat shrunk, and when it exceeds 1,300, the molding temperature rises with an increase of the melt viscosity so that the fibers may possibly cause coloration.

The compatible chlorinated vinyl chloride resin and the heat resistant chlorinated vinyl chloride resin which are used in the invention are ones obtained by chlorinating a vinyl chloride resin.

The chlorine content of the compatible chlorinated vinyl chloride resin is from 57 to 64% by weight (hereinafter, the chlorine content will be expressed merely by "%"). Within this range, the compatible chlorinated vinyl chloride resin has compatibility with any of the vinyl chloride resin and the heat resistant chlorinated vinyl chloride resin as described later.

When the chlorine content of the compatible chlorinated vinyl chloride resin is less than 57%, the compatibility with the heat resistant vinyl chloride resin tends to become worse, and when it exceeds 64%, the compatibility with the vinyl chloride resin tends to become worse.

The average degree of polymerization of the compatible chlorinated vinyl chloride resin is from 450 to 800. When the average degree of polymerization is less than 450, an effect for lowering the heat shrinkage of the polyvinyl chloride fibers is not obtained, and when it exceeds 800, the spinning performance become worse.

The blending amount of the compatible chlorinated vinyl chloride resin is from 3 to 20 parts by weight, preferably from 3 to 15 parts by weight, and more preferably from 3 to 10 parts by weight, based on 100 parts by weight of the vinyl chloride resin. When the blending amount is less than 3 parts by weight, an effect as a compatibilizing agent cannot be sufficiently revealed so that the spinning performance become worse; and even when the compatible chlorinated vinyl chloride resin is blended in an amount exceeding 20 parts by weight, the effect reaches the peak, and the heat shrinkage of the polyvinyl chloride fibers tends to become large.

The fluidity of the compatible chlorinated vinyl chloride resin is 0.05 cc/sec or more and not more than 0.2 cc/sec. When the fluidity is 0.05 cc/sec or more, the compatibility with the vinyl chloride resin becomes good, and hence, such is preferable; and when it is not more than 0.2 cc/sec, the compatibility with the heat resistant chlorinated vinyl chloride resin becomes good, and hence, such is preferable.

The value of the fluidity is one obtained by measuring a composition containing 2.0 parts by weight of a tin based stabilizer, 0.7 parts by weight of a higher fatty acid, 2.3 parts by weight of an ester wax, and 10 parts by weight of a methyl methacrylate/butadiene/styrene copolymer based on 100 parts by weight of the chlorinated vinyl chloride resin under a condition having a temperature of 190° C., a load of 100 kg/cm$^2$ and a die dimension of 1φ×1 mm using a Koka flow tester, and all of the fluidities in this application are ones measured by this method.

The heat resistant chlorinated vinyl chloride resin is an essential component for the purpose of lowering the heat shrinkage. The chlorine content of this resin is from 65 to 71%. When the chlorine content is less than 65%, an effect for lowering the heat shrinkage is not obtained, and when it exceeds 71%, the spinning performance tend to become worse.

The average degree of polymerization of the heat resistant chlorinated vinyl chloride resin is from 450 to 1,100. When the average degree of polymerization is less than 450, an effect for lowering the heat shrinkage is not obtained, and when it exceeds 1,100, the spinning performance tend to become worse.

The blending amount of the heat resistant chlorinated vinyl chloride resin is from 10 to 30 parts by weight, preferably from 10 to 20 parts by weight, and more preferably from 10 to 15 parts by weight, based on 100 parts by weight of the vinyl chloride resin. When the blending amount is less than 10 parts by weight, an effect for lowering the heat shrinkage is not obtained; and when the heat resistant chlorinated vinyl chloride resin is blended in an amount exceeding 30 parts by weight, the spinning performance tend to become worse.

The fluidity of the heat resistant chlorinated vinyl chloride resin is 0.005 cc/sec or more and less than 0.05 cc/sec. When the fluidity is 0.005 cc/sec or more, the spinning performance become good, and hence, such is preferable; and when it is less than 0.05 cc/sec, an effect for lowering the heat shrinkage is obtained, and hence, such is preferable.

In the invention, the heat stabilizer is necessary for enhancing the spinning performance of the resin composition and inhibiting heat decomposition of the resin composition itself from occurrence in melt-spinning the resin composition due to a synergistic effect with the compatible chlorinated vinyl chloride resin to be blended in the resin composition.

The blending amount of the heat stabilizer is from 0.1 to 10 parts by weight, preferably from 3 to 10 parts by weight, and more preferably from 5 to 10 parts by weight, based on 100 parts by weight of the vinyl chloride resin. When the blending amount is less than 0.1 parts by weight, an effect for preventing the heat decomposition at the time of melt-spinning is not obtained; and when the heat stabilizer is blended in an amount exceeding 10 parts by weight, a block of the resin is formed in the vicinity of an outlet of a mold so that there is a tendency that spinning cannot be stably carried out.

As the heat stabilizer, known ones such as hydrotalcite based, calcium-zinc based, epoxy based, organic phosphite based, β-diketone based, zeolite based, mercapto tin based, tin maleate based, tin laurate based and barium-zinc based stabilizers can be used. Of these, one kind or a mixture of two or more kinds of hydrotalcite based, calcium-zinc based, epoxy based, organic phosphite based and β-diketone based stabilizers are especially preferable because long-term stability at the time of spinning and a synergistic effect with the compatible chlorinated vinyl chloride resin are more likely obtained.

So far as the effects of the invention are not hindered, conventionally known additives which are used in resin compositions may be blended in the resin composition of the invention according to the purpose. Examples of the additives include a lubricant, a resin for modification, a processing auxiliary, a reinforcing agent, an ultraviolet light absorber, an antioxidant, an antistatic agent, a filler, a fire retardant, a pigment, an initial color improver, a conductivity imparting agent, a surface treating agent, a delusterant, a light stabilizer, and a flavor.

With respect to the size of a single thread of the polyvinyl chloride fiber, a size of from 20 to 100 deniers is suitable for the artificial hairs because a nature-like effect is revealed, and a size of from 50 to 80 deniers is more suitable in view of the touch and texture.

The cross-sectional shape of the polyvinyl chloride fibers for artificial hairs of the invention may be any shape, for example, a circular shape, an elliptic shape, a spectacle shape (a shape wherein two circles are connected via a rectangle), a star shape, a C-shape, an H-shape, a T-shape, a Y-shape, a cross shape, a triangular shape, a heart shape, a cocoon shape (a shape wherein two circles are partly overlaid), or a hollow body thereof. Also, fibers having various cross-sectional shapes can be properly combined and used.

With respect to the production process of polyvinyl chloride fibers, the polyvinyl chloride fibers are obtained by mixing the resin composition of this application using a conventionally known mixing machine (for example, a Henschel mixer and a ribbon blender) and melt-spinning the mixture using a conventionally known metal extruder (for example, a single screw extruder, a counter-rotating two screw extruder, and a conical twin-screw extruder), followed by a stretching treatment step and a thermal relaxation treatment step.

Examples of the artificial hairs according to the invention include ones for decorating the hair, for example, wigs, hairpieces, braids, extension hairs, and accessory hairs, and doll hairs.

EXAMPLES

The invention will be more specifically described below with reference to the Examples and Comparative Examples, but it should not be construed that the invention is limited to these Examples so far as they do not exceed the gist of the invention.

(Specializing Method of Chlorinated Vinyl Chloride Resin)

<Fluidity>

The fluidity is one obtained by measuring a composition containing 2.0 parts by weight of a tin based stabilizer, 0.7 parts by weight of a higher fatty acid, 2.3 parts by weight of an ester wax, and 10 parts by weight of a methyl methacrylate/butadiene/styrene copolymer based on 100 parts by weight of the chlorinated vinyl chloride resin under a condition having a temperature of 190° C., a load of 100 kg/cm$^2$ and a die dimension of 1φ×1 mm using a Koka flow tester.

(Evaluation Method of Characteristics)

1. Heat Shrinkage:

The heat shrinkage expresses a degree of shrinkage generated in heat treating a specimen. In testing the heat shrinkage, a specimen adjusted so as to have a length of 100 mm is heat treated in a gear oven of 100° C. for 15 minutes, a ratio of the length of the specimen before and after the heat treatment is measured, and a ratio of heat shrinkage is determined from an average value of ten specimens. The case where the ratio of heat shrinkage is less than 7% was evaluated as "⊚"; the case where it is 7% or more and less than 10% was evaluated as "○"; and the case where it is 10% or more was evaluated as "×". In products, while a ratio of heat shrinkage in products is required to be less than 10%, it is more preferable that the ratio of heat shrinkage is less than 7%.

2. Spinning Performance:

The spinning performance express molding performance in melt-spinning a resin composition. In testing the spinning performance, when 120 threads of fibrous bodies are extrusion molded simultaneously from a spinning mold, the number of occurrence of thread breakage (a phenomenon wherein several threads of fibrous bodies are broken during the melt extrusion) is measured.

The case where the number of occurrence of thread breakage during the measurement is 0 was evaluated as "502"; the case where it is 1 was evaluated as "○"; and the case where it is 2 or more was evaluated as "×". An appropriate condition in the production is not more than 1. Incidentally, the measurement time was 30 minutes, and the number of measurement was 3.

TABLE 1

|  |  | Example | | | |
|---|---|---|---|---|---|
|  |  | 1 | 2 | 3 | 4 |
| Blending: | | | | | |
| Vinyl chloride resin | Blending amount (parts by weight) | 100 | 100 | 100 | 100 |
| Compatible chlorinated vinyl chloride resin | Blending amount (parts by weight) | 5 | 15 | 7 | 7 |
|  | Chlorine content (%) | 63 | 61 | 61 | 62 |
|  | Degree of polymerization | 800 | 600 | 600 | 700 |
|  | Fluidity (cc/sec) | 0.03 | 0.12 | 0.12 | 0.06 |
| Heat resistant chlorinated vinyl chloride resin | Blending amount (parts by weight) | 11 | 15 | 12 | 12 |
|  | Chlorine content (%) | 67 | 66 | 67 | 69 |
|  | Degree of polymerization | 700 | 500 | 700 | 600 |
|  | Fluidity (cc/sec) | 0.02 | 0.07 | 0.02 | 0.01 |
| Heat stabilizer | Blending amount (parts by weight) | 0.5 | 9 | 8 | 8 |
| Characteristics: | | | | | |
| Heat shrinkage |  | ○ | ○ | ⊚ | ⊚ |
| Spinning performance |  | ○ | ⊚ | ⊚ | ⊚ |

TABLE 2

|  |  | Comparative Example | | | | | | |
|---|---|---|---|---|---|---|---|---|
|  |  | 1 | 2 | 3 | 4 | 5 | 6 | 7 |
| Blending: | | | | | | | | |
| Vinyl chloride resin | Blending amount (parts by weight) | 100 | 100 | 100 | 100 | 100 | 100 | 100 |
| Compatible chlorinated vinyl chloride resin | Blending amount (parts by weight) | 2 | 22 | 7 | 7 | 7 | 7 | 7 |
|  | Chlorine content (%) | 61 | 61 | 56 | 65 | 63 | 61 | 61 |
|  | Degree of polymerization | 600 | 600 | 800 | 600 | 400 | 850 | 600 |
|  | Fluidity (cc/sec) | 0.12 | 0.12 | 0.15 | 0.06 | 0.25 | 0.04 | 0.12 |
| Heat resistant chlorinated vinyl chloride resin | Blending amount (parts by weight) | 12 | 12 | 12 | 12 | 12 | 12 | 8 |
|  | Chlorine content (%) | 67 | 67 | 67 | 67 | 67 | 67 | 67 |
|  | Degree of polymerization | 700 | 700 | 700 | 700 | 700 | 700 | 700 |
|  | Fluidity (cc/sec) | 0.02 | 0.02 | 0.02 | 0.02 | 0.02 | 0.02 | 0.02 |
| Heat stabilizer | Blending amount (parts by weight) | 8 | 8 | 8 | 8 | 8 | 8 | 8 |
| Characteristics: | | | | | | | | |
| Heat shrinkage |  | ⊚ | X | X | ⊚ | X | ⊚ | X |
| Spinning performance |  | X | ⊚ | ⊚ | X | ⊚ | X | ⊚ |

|  |  | Comparative Example | | | | | | |
|---|---|---|---|---|---|---|---|---|
|  |  | 8 | 9 | 10 | 11 | 12 | 13 | 14 |
| Blending: | | | | | | | | |
| Vinyl chloride resin | Blending amount (parts by weight) | 100 | 100 | 100 | 100 | 100 | 100 | 100 |
| Compatible chlorinated vinyl chloride resin | Blending amount (parts by weight) | 7 | 7 | 7 | 7 | 7 | 7 | 7 |
|  | Chlorine content (%) | 61 | 61 | 61 | 61 | 61 | 61 | 61 |
|  | Degree of polymerization | 600 | 600 | 600 | 600 | 600 | 600 | 600 |
|  | Fluidity (cc/sec) | 0.12 | 0.12 | 0.12 | 0.12 | 0.12 | 0.12 | 0.12 |
| Heat resistant chlorinated vinyl chloride resin | Blending amount (parts by weight) | 33 | 12 | 12 | 12 | 12 | 12 | 12 |
|  | Chlorine content (%) | 67 | 64 | 73 | 69 | 66 | 67 | 67 |
|  | Degree of polymerization | 700 | 700 | 500 | 400 | 1150 | 700 | 700 |
|  | Fluidity (cc/sec) | 0.02 | 0.04 | 0.003 | 0.03 | 0.01 | 0.02 | 0.02 |
| Heat stabilizer | Blending amount (parts by weight) | 8 | 8 | 8 | 8 | 8 | 0.05 | 12 |
| Characteristics: | | | | | | | | |
| Heat shrinkage |  | ⊚ | X | ⊚ | X | ⊚ | X | X |
| Spinning performance |  | X | ⊚ | X | ⊚ | X | X | X |

Example 1

Polyvinyl chloride fibers to be used in Example 1 are ones obtained by melt-spinning a resin composition of a blend of 100 parts by weight of a vinyl chloride resin (TH-1000, manufactured by Taiyo Vinyl Corp.), 5 parts by weight of a compatible chlorinated vinyl chloride resin (a custom-made, manufactured by Sekisui Chemical Co., Ltd.), 11 parts by weight of a heat resistant chlorinated vinyl chloride resin (a custom-made, manufactured by Sekisui Chemical Co., Ltd.), and 0.5 parts by weight of a heat stabilizer (CP-234A, manufactured by Nissan Chemical Industries, Ltd.) by a melt extruder, followed by a stretching step and a thermal relaxation treatment step to mold in an average fineness of 60 deniers. The chlorine content, degree of polymerization and fluidity of each of the used compatible chlorinated vinyl chloride resin and heat resistant chlorinated vinyl chloride resin were shown in Table 1.

The melt-spinning of the polyvinyl chloride fibers was carried out by extrusion molding the foregoing composition at an extrusion rate of 10 kg/hr so as to have an average fineness of 180 deniers from a spinning mold having a nozzle cross-sectional area of 0.06 mm$^2$, the number of pores of 120 and a mold temperature of 175° C. The stretching treatment was carried out by stretching the fibers resulting from melt-spinning to a degree of 300% in an air atmosphere of 105 ° C.; and the thermal relaxation treatment was carried out by heat treating the stretched fibers in an air atmosphere of 110 ° C. until the whole length of fiber became 75% of the length before the treatment.

Examples 2 to 4

Polyvinyl chloride fibers were obtained in the same manner as in Example 1, except for changing the blending amount, chlorine content, degree of polymerization and fluidity of each of the used resins and the blending amount of the heat stabilizer to the values shown in Table 1, and then evaluated in the same manner.

Comparative Examples 1 to 14

Polyvinyl chloride fibers were obtained in the same manner as in Example 1, except for changing the blending amount, chlorine content, degree of polymerization and fluidity of each of the used resins and the blending amount of the heat stabilizer to the values shown in Table 2, and then evaluated in the same manner.

The evaluation results of the respective Examples and Comparative Examples were summarized and shown in Tables 1 and 2. The polyvinyl chloride fibers of the respective Examples were in a usable level (○ or more) with respect to all of the spinning performance and heat shrink properties; and those of Examples 3 and 4 included many good levels (◎) among the respective evaluation items. The polyvinyl chloride fibers of Comparative Examples 1 to 14 were problematic with respect to the melt-spinning properties or heat shrink properties.

While the invention has been described in detail and with reference to specific embodiments thereof, it will be apparent to one skilled in the art that various changes and modifications can be made therein without departing from the spirit and scope thereof.

This application is based on a Japanese patent application filed Apr. 4, 2003 (Japanese Patent Application No. 2003-101663) and a Japanese patent application filed May 13, 2002 (Japanese Patent Application No. 2003-134604), the contents of which are incorporated therein and made hereof by reference.

INDUSTRIAL APPLICABILITY

The invention is concerned with polyvinyl chloride fibers obtained by molding a resin composition containing a vinyl chloride resin and specific chlorinated vinyl chloride resins into a fibrous form, a process of producing the same and applications thereof. According to the invention, polyvinyl chloride fibers which are small in heat shrink properties even in an atmosphere of 100° C. or higher in secondary processing for the purpose of using for artificial hairs, etc., a process of producing the same and applications thereof can be obtained.

The invention claimed is:

1. Polyvinyl chloride fibers comprising
100 parts by weight of a vinyl chloride resin;
from 3 to 20 parts by weight of a compatible chlorinated vinyl chloride resin;
from 10 to 30 parts by weight of a heat resistant chlorinated vinyl chloride resin; and
from 0.1 to 10 parts by weight of a heat stabilizer,
wherein,
the compatible chlorinated vinyl chloride resin has a chlorine content of from 57 to 64 % by weight and an average degree of polymerization of from 450 to 800, and
the heat resistant chlorinated vinyl chloride resin has a chlorine content of from 65 to 71% by weight and an average degree of polymerization of from 450 to 1,100.

2. The polyvinyl chloride fibers according to claim 1, wherein the compatible chlorinated vinyl chloride resin has a fluidity of 0.05 cc/sec or more and not more than 0.2 cc/sec, and the heat resistant chlorinated vinyl chloride resin has a fluidity of 0.005 cc/sec or more and less than 0.05 cc/sec.

3. The polyvinyl chloride fibers according to claim 1, wherein the heat stabilizer is one kind or a mixture of two or more kinds selected from hydrotalcite compounds, calcium-zinc based compounds, epoxy compounds, organic phosphite compounds, and β-diketones.

4. Artificial hairs formed of the polyvinyl chloride fibers according to claim 1.

5. The polyvinyl chloride fibers according to claim 2, wherein the heat stabilizer is one kind or a mixture of two or more kinds selected from hydrotalcite compounds, calcium-zinc based compounds, epoxy compounds, organic phosphite compounds, and β-diketones.

6. Artificial hairs formed of the polyvinyl chloride fibers according to claim 3.

* * * * *